United States Patent

Trautner

[11] Patent Number: 5,880,675
[45] Date of Patent: Mar. 9, 1999

[54] REUSABLE PACKAGE FOR IDENTIFICATION DEVICES

[75] Inventor: Stefan Trautner, Schwandorf, Germany

[73] Assignee: Texas Instruments Incorporated, Dallas, Tex.

[21] Appl. No.: 444,486

[22] Filed: May 19, 1995

[51] Int. Cl.$^6$ .................................................. G08B 13/00
[52] U.S. Cl. ..................... 340/572; 340/468; 70/57.1; 24/704.2
[58] Field of Search .............................. 340/572; 70/57.1; 24/704.2

[56] References Cited

U.S. PATENT DOCUMENTS

| | | | |
|---|---|---|---|
| 4,299,870 | 11/1981 | Humble | 70/57.1 |
| 4,774,503 | 9/1988 | Bussard | 340/572 |
| 4,811,000 | 3/1989 | Humphrey et al. | 340/551 |
| 4,812,823 | 3/1989 | Dickerson | 340/572 |
| 4,813,564 | 3/1989 | Cooper et al. | 340/572 |
| 5,053,774 | 10/1991 | Schuemann et al. | 342/44 |

*Primary Examiner*—Edward Lefkowitz
*Attorney, Agent, or Firm*—Robby T. Holland; James C. Kesterson; Richard L. Donaldson

[57] ABSTRACT

In one embodiment, a kit for reusably attaching an identification transponder 22 to an object 16 to be identified is disclosed. The kit includes an outer sleeve 10, an inner package 12 and, optionally, a release tool 14. The outer sleeve 10 is preferably formed of a non-electrically conducting material and includes an outer locking mechanism 18 disposed therein. The inner package 12 will store the identification transponder 22 and includes an inner locking mechanism 20 for cooperating for with the locking mechanism 18 within the outer sleeve 10. The inner package 12 is operable to be secured within the outer sleeve 10 when the inner locking mechanism 20 and the outer locking mechanism 18 are engaged. If included, the release tool 14 can be used for removing the inner package 12 from the outer sleeve 10 by disengaging the inner locking mechanism 20 from the outer locking mechanism 18.

18 Claims, 1 Drawing Sheet

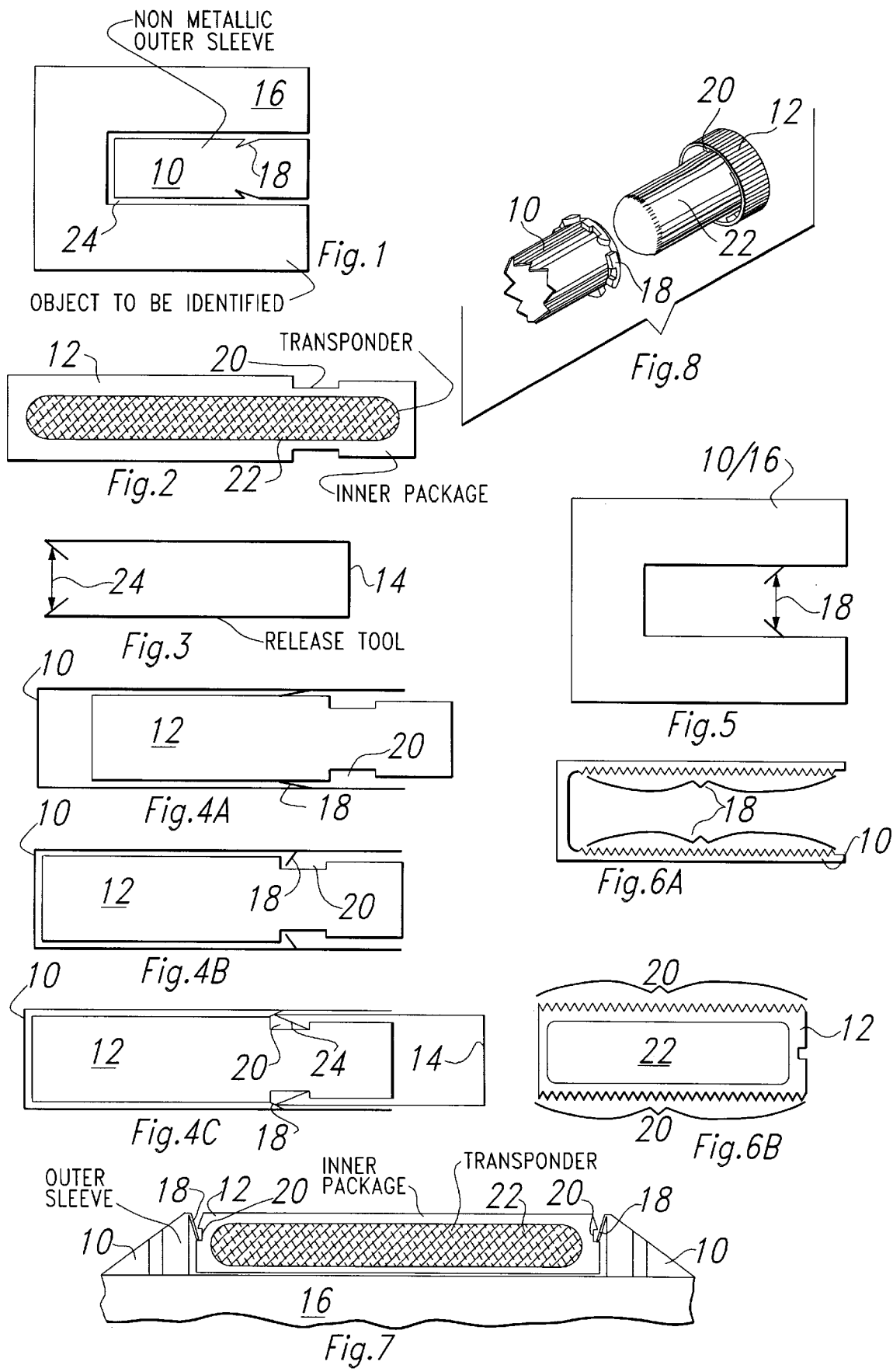

5,880,675

REUSABLE PACKAGE FOR IDENTIFICATION DEVICES

FIELD OF THE INVENTION

This invention generally relates to the identification systems and specifically to a reusable package for use with an identification device.

BACKGROUND OF THE INVENTION

There is a great need for devices or apparatuses which make it possible to identify or detect objects in a contactless manner and over a certain distance. In addition, a need exists to be able to change the data stored in, or operating characteristics of, these devices or apparatuses (e.g., "program" the devices or apparatuses).

It is, for example, desirable to contactlessly request, over a certain distance, identifications which are uniquely assigned to an object. These identifications could be stored in the device or apparatus, sometimes referred to as a transponder, so that, for example, the object may be identified. A determination may also be made as to whether or not a particular object exists within a given reading range.

One example of a case in which such a device is needed is the computer controlled industrial production in which, without the intervention of operating personnel, components are taken from a store, transported to a production location and there assembled to give a finished product. In this case a device is required which can be attached to the individual components so that the components can be specifically detected in the spares store and taken therefrom. Also the location and status of the component can be tracked throughout the production cycle.

Similarly, in another example, an identification device can be used in a warehouse to track the locations of various inventory items. A computer based inventory control system could then track the locations, storage time and other information regarding inventory. In this case, the device can be attached either to the inventory items themselves or to carriers used to transport and/or store the items, such as pallets or crates.

In many applications, where things have to be identified via an identification, the identification devices or transponders are not used by the end user of the object being identified. The seller, e.g., manufacturer or distributor, gives the goods away after the handling cycle. If the transponder is sold along with the product, the ratio between the price of the part and the transponder must be large enough to make it profitable to pay for one transponder for each part sold. These "parts sold" can be the seller's product itself, a pallet, a box or any kind of work piece holder.

Another solution is to mount the transponder to the object which must be identified. Normally, the transponder will be glued into a hole with some kind of silicon or glue. Once you have glued a transponder into a pallet, or other object, the identification tag is secured against damage due to rough handling of the pallet and also against inadvertent loss. But, to demount the transponder in order to reuse it costs a lot of time, money and the risk to damage the tag.

Accordingly, an improved method of quickly, inexpensively and safely removing an identification tape is presently desired.

SUMMARY OF THE INVENTION

Other objects and advantages will be obvious, and will in part appear hereinafter and will be accomplished by the present invention which provides a reusable package for use with an identification device.

In one embodiment, a kit for reusably attaching an identification transponder to an object to be identified is disclosed. The kit includes an outer sleeve, an inner package and optionally a release tool. The outer sleeve is formed preferably of a nonelectrically conducting material and includes an outer locking mechanism disposed therein. The inner package will store the identification transponder and includes an inner locking mechanism for cooperating for with the locking mechanism within the outer sleeve. The inner package is operable to be secured within the outer sleeve when the inner locking mechanism and the outer locking mechanism are engaged. If included, the release tool can be used for removing the inner package from the outer sleeve by disengaging the inner locking mechanism from the outer locking mechanism.

The present invention provides a number of advantages over prior art systems. First, the reusable package disclosed herein reduces costs for the user because the transponder tags can be reused. In addition, the packaging is inexpensive and, as a result, inexpensive objects can be identified. With other packages, inexpensive objects simply cannot justify the cost of an expensive manufacturing tool. This transponder packaging, on the other hand, will not cost much even at high volumes of pieces per day.

In addition, objects which aren't permanently located at the users location can be identified. The invention is also usable with objects which are in real production and distribution cycles. Further, the packaging is independent of the transponder type (e.g., shape, function, memory size) and all parts can be identified.

BRIEF DESCRIPTION OF THE DRAWINGS

The above features of the present invention will be more clearly understood from consideration of the following descriptions in connection with accompanying drawings in which:

FIG. 1 is a first embodiment outer sleeve;

FIG. 2 is a first embodiment inner package;

FIG. 3 is a first embodiment release tool;

FIG. 4A–4C illustrates the insertion and removal of the inner package from the outer sleeve.

FIG. 5 illustrates an outer sleeve which is part of the object to be identified; and FIGS. 6A and 6B illustrate a second embodiment outer sleeve and inner package;

FIG. 7 illustrates a third embodiment package; and

FIG. 8 illustrates a fourth embodiment package.

Corresponding numerals and symbols in the different figures refer to corresponding parts unless otherwise indicated.

DETAILED DESCRIPTION OF ILLUSTRATIVE EMBODIMENTS

The making and use of various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

In one aspect, the present invention includes a two piece package which includes an outer sleeve 10 (FIG. 1) and an inner package 12 (FIG. 2). These two piece packages can be used along with a release tool 14 (FIG. 3). A preferred embodiment of each of the components will be described first followed by a description of how the components may be used. Variations and modifications of the present invention will then be described.

In general, there are four major steps to improve the transponder mounting and demounting process. First, an outer sleeve 10 is permanently affixed to the part which has to be identified. The transponder 22 is mounted into an inner package 12 which is shaped to conform with the inner surface of the outer sleeve 10. The inner package 12 with the built in transponder 22 is inserted into the sleeve 10 where it will be mechanically secured. The inner package, along with the transponder 22, can then be easily removed from the object. These steps will be described in greater detail below.

Referring first to FIG. 1, an outer sleeve 10 is permanently affixed to an object 16 which will be identified. The outer sleeve 10 may be affixed within a whole within the object 16 or otherwise attached thereto. In this context, the term "permanently affixed" means permanent in terms of the time the inner package 12 is mounted to the object 16. In other words, the outer sleeve 10 will be affixed to object 10 before inner package 12 is introduced, during the period inner package 12 is mounted within the outer sleeve 10 and after the inner package 12 is removed. "Permanently affixed" is not meant to connote forever, only during the relevant times from just before to just after mounting the inner package 12. The outer sleeve can, of course, be fitted for staying in the object forever.

The outer sleeve 10 includes an outer locking mechanism 18. In the example of FIG. 1, the outer locking mechanism 18 comprises at least one protrusion as shown. This protrusion 18 can be used to secure a cooperating inner locking mechanism 20 of the inner package 12 (See FIG. 2). The interrelation of the locking mechanisms 18 and 20 will be more fully discussed below.

The outer sleeve 10 may be formed of any material which will not shield electro-magnetic communications to and from transponder 22 when the transponder 22 is mounted therein. In general, most non-electrically conductive materials will do. For example, the outer sleeve 10 may be formed of plastic or other materials such as wood or teflon. The outer sleeve 10 may comprise a cylindrical tube or may be of any other appropriate shape. The only limitation is that the shape of the outer sleeve 10 must correspond with that of the inner package 12 so that the two can be secured to one another.

For mounting the outer sleeve 10, a hole 24 may be drilled into any non metallic portion of the object 16 which has to be identified. Depending on the outer shape of the sleeve 10, a thread may also be cut into the hole 24. Then the sleeve 10 may be inserted in the hole 24. According to the shape of the hole 24 and the used connecting technology, the sleeve 10 can be glued, pressed, doweled or screwed into the object 16. The hole should preferably be as deep or deeper than the whole sleeve 10 so that the sleeve 10 can be inserted completely. Preferably, the outer sleeve 10 should not stick out because other things or a fork of a forklift truck could accidentally clip the sleeve 10 or the inner package 12.

A preferred embodiment of the inner package 12 is shown in FIG. 2. In this embodiment, an identification transponder 22 is disposed within the inner package 12. The transponder 22 can be any of the many different identification transponders which are commercially available. One such identification transponder 22 is a TIRIS™ (Texas Instruments Radio Frequency Identification System) brand transponder manufactured by Texas Instruments. An example of a transponder is disclosed in U.S. Pat. No. 5,053,774, issued Oct. 1, 1991, incorporated herein by reference.

As with the outer sleeve 10, the inner package 12 can be formed of any material which will allow communication to and from the transponder 22. Preferably, the inner package 12 is formed from a non-electrically conductive material such as plastic but other materials such as wood or teflon can also be used.

The inner package 12 includes an inner locking mechanism 20 which will be cooperative with the outer locking mechanism 18 of the outer sleeve 10. In the illustrated example, the inner locking mechanism 20 comprises at least one notch 20 formed in the outer surface of the inner package 12. This notch 20 will be engageable with the protrusion 18 of the outer sleeve.

The outer shape of inner package 12 has to be compatible with the inner shape of the outer sleeve 10. The method of mounting the transponder 22 into the package 12 will depend on, or at least in part on, the material of the inner package 12. In the case where plastic is used for the inner package 12, the transponder 22 could be injected directly at the production cycle of the second package 12. In another embodiment, the transponder 22 will be glued into the inner package 12. In any case, the main function of the second package is to carry the transponder 22 and to protect it against all application specific mechanical stress.

In general, the connection technology between the outer sleeve 10 and the inner package 12 should fulfill as many of the following features as possible. First, it should not be necessary to use any adhesive or tool to put the two parts (outer sleeve 10 and inner package 12) together. Also, the mechanic should lock itself while the inner package 12 is put into the sleeve 10. The locking mechanism should be able to withstand all application specific mechanical loads. For unlocking the inner package 12, only a simple tool (e.g., release tool 14 of FIG. 3), if anything, should be necessary. This release process should be fast and simple for the daily use. Finally, the mechanic should be usable for the entire lifetime of the identified part 16.

Once the inner package 12 is mounted, no part of the packaging 10/12 should stick out of the object 16 surface which has to be identified. In the preferred embodiment, the outer sleeve 10 will be flush with the outer surface of object 16. If any part sticks out, the inner package 12 could be destroyed due to strong mechanical impacts. One exception could be, to design the headpiece as flat as possible or necessary and without any sharp edges.

It may be necessary to use a release tool 14 for releasing the inner package 12 together with the transponder. In the case where the outer shape of the inner package 12 and the inner shape of the outer sleeve 10 have a thread (see FIGS. 6A and 6B), the release tool may comprise any type of screwdriver or screw spanner.

FIG. 3 illustrates a preferred embodiment release tool 14 which can be utilized with the outer sleeve 10 and inner package 12 illustrated in FIGS. 1 and 2, respectively. The release tool 14 can be used to remove inner package 12 from outer sleeve 10 by disengaging the inner locking mechanism 20 from the outer locking mechanism 18. The release tool 14 includes protrusions 24 which may be used to engage with the inner locking mechanism 20 of inner package 12.

The release tool 14 can be formed of most any material including electrically conductive material since it is unlikely the transponder 22 will be in electro-magnetic communication with another device during the removal process. For example, the tool 14 may be formed of either metal or plastic.

In general, the design of the tool 14 should fulfill the maximum number of the following requirements. First, the tool 14 is preferably reusable. It should also be mechanically compatible with the locking mechanism 18/20 between the outer sleeve 10 and the inner package 12. The tool 14 should facilitate easy handling. In addition, to maximize the lifetime of each component, the release tool 14 should not damage the outer sleeve 10 or especially the reusable inner package 12.

The operation of the specific package kit illustrated in FIGS. 1–3 will now be described with respect to FIGS. 4A–4C. Referring first to FIG. 4A, the inner package 12 is inserted in the outer sleeve 10. In doing so, the protrusions 18 are compressed so that inner package 12 can be inserted. When the notches 20 are adjacent to the protrusions 18, the protrusions 18 will decompress so that the inner package 12 is mechanically locked into the outer sleeve 10, as illustrated in FIG. 4B. It is noted that the inner package 12 is securely fastened to the sleeve and no adhesive has been used. The removal of inner package 12 with release tool 14 is illustrated in FIG. 4C. The release tool 14 is inserted between outer sleeve 10 and inner package 12 thereby compressing protrusions 18. The release protrusions 24 will engage in notch 20 and the inner package 12 may be removed from the outer sleeve 10. This removal method is simple, quick and inexpensive and the transponder 22 with the inner package 12 can be reused. The only component which must be purchased for each object to be identified is the outer sleeve 10, and this component can be inexpensively made from plastic or other materials.

Several variations of the present invention can also be utilized. As illustrated by FIG. 5, the outer sleeve 10 may be part of the object 16 to be identified. For example, if the object 16 is a plastic part, the sleeve 10 can be formed by the same process as the remainder of the part. In this situation, there will be no additional cost for the sleeve 10 since it is formed with the device 16. In this example, the outer sleeve 10 certainly is permanently affixed to the object 16 which will be identified.

Another embodiment locking mechanism 18/20 is illustrated in FIGS. 6A and 6B. As alluded to above, the inner surface of the outer sleeve 10 can be threaded. Correspondingly, the outer surface of inner package 12 will also be threaded. In this case, the inner package 12 can simply be screwed into the outer sleeve 10. The corresponding threads on the outer sleeve 10 and inner package 12 will serve as the outer locking mechanism 18 and inner locking mechanism 20. In this case, a screwdriver can be used as a release tool to remove the inner package 12 from the outer sleeve 10 by disengaging the inner locking mechanism 20 from the outer locking mechanism 18.

In FIGS. 6A and 6B the threads 18 and 20 on the outer sleeve 10 and inner package 12 extend the entire length of the respective package. It is noted, however, that this feature is not required. Either the inner threads 20, the outer threads 18 or both may extend over only a portion of the package 12 or 10. The only requirement is that the inner package 12 be secured in the outer sleeve 10.

As another example, the packaging system of the present invention can comprise a "bayonet socket." In this embodiment, the inner sleeve is pushed into the outer sleeve and rotated, for example 90°, such that a hook on the inner package will lock with a ledge on the outer sleeve. This kind of connecting device is similar to connectors which can be used with the objective of a camera, for connecting to garden hoses, or with electrical connectors.

Another mounting technique is illustrated in FIG. 7. In FIG. 7, the outer sleeve 10 comprises a base plate which can be mounted to object 16 by glue, screws, nails, rivets or any other appropriate method. The base plate 10 includes protrusions 18, which will lock into the notches 20 which are formed in the corresponding place of inner package 12. As with the other embodiments, the inner package can mechanically lock into the outer sleeve 10 without the use of an adhesive. With this method, the transponder 22 can be fitted to any flat surface or with simple adapters (not shown) can also be fitted to a bent surface. The packaging is independent of the shape of the transponder housing.

As yet another example, the packaging system of the present invention can comprise a secure locking system similar to the ones used to secure a lid to a medicine bottle or cleaner. An example of this embodiment is illustrated in FIG. 8 which shows the outer sleeve 10 and the inner package 12 without any object 16. The inner package 12 comprises a lid which fits over an outer rim of outer sleeve 10. The outer sleeve 10 includes notched protrusions 18 formed on the outer surface of the sleeve 10 near the rim. Each of the notched protrusions 18 corresponds to a protrusion 20 on the inner surface of inner package 12. The transponder 22 is outwardly attached to the inner package 12 so that it will fit within outer sleeve 10 when secured. It is noted that no tool is needed to secure or unsecure the package.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A reusable package for an identification transponder, said package comprising:

an outer sleeve for being permanently affixed to an object which will be identified, said outer sleeve being formed of material which will not impede communications to and from said identification transponder; and an inner package including said identification transponder disposed therein, said inner package being formed of a material which will not impede communications to and from said identification transponder, said inner package for being inserted within said outer sleeve and for mechanically locking into said outer sleeve without use of an adhesive.

2. The package of claim 1 wherein said inner package includes an outer surface with at least one notch formed therein, said notch for cooperating with protrusions in said outer sleeve.

3. The package of claim 1 wherein said inner package includes an outer surface with a thread formed therein, the thread for cooperating with a corresponding thread within said outer sleeve.

4. The package of claim 1 wherein said outer sleeve comprises a base plate.

5. The package of claim 4 wherein said base plate is affixed to an outer surface of said object which will be identified.

6. The package of claim 5 wherein said outer surface comprises a flat surface.

7. The package of claim 1 wherein said inner package comprises a lid which includes a plurality of lid protrusions formed on an inner surface, and wherein said outer sleeve includes a plurality of notched protrusions disposed on an outer surface, wherein each of said lid protrusions can be secured within a corresponding one of said notched protrusions.

8. The package of claim 1 wherein said outer sleeve is a part of said object which will be identified.

9. The package of claim 1 wherein said outer sleeve comprises a plastic sleeve.

10. The package of claim 1 wherein said outer sleeve is flush with said object which will be identified.

11. The package of claim 1 wherein said inner package is removable from said outer sleeve with the use of a tool.

12. An identification transponder package including an identification transponder within the package, said transponder package for being mechanically locked within a non-conductive sleeve, said transponder package including an outer surface which has notches formed therein for cooperating with protrusions in said sleeve, said transponder package capable of being mechanically locked into said sleeve without use of an adhesive and being removable from said sleeve with the use of a tool, said transponder package formed of a material which will not impede electromagnetic communications to and from said transponder.

13. An identification transponder package including an identification transponder with the package, the transponder package for being mechanically locked within a non-conductive sleeve, said transponder package including an outer surface which has a thread formed therein for cooperating with a corresponding thread within said sleeve, said transponder package capable of being screwed into said sleeve without use of an adhesive and being removable from said sleeve, said transponder package formed of a material which will not impede electromagnetic communications to and from said transponder.

14. A kit for reusably attaching an identification transponder to an object to be identified, said kit comprising:

an outer sleeve formed of a non-electrically conducting material, said outer sleeve including an outer locking mechanism disposed therein;

an inner package for storing said identification transponder, said inner package including an inner locking mechanism for cooperating with said locking mechanism within said outer sleeve, said inner package operable to be secured within said outer sleeve when said inner locking mechanism and said outer locking mechanism are engaged; and a release tool for use in combination with said outer sleeve and inner package, said release tool for removing said inner package from said outer sleeve by disengaging said inner locking mechanism from said outer locking mechanism.

15. The kit of claim 14 wherein said outer locking mechanism includes at least one protrusion and said inner locking mechanism comprises at least one notch disposed in an outer surface of said inner package, wherein said inner and outer locking mechanisms are engaged when said protrusion is engaged within said notch.

16. The kit of claim 14 where said outer locking mechanism comprises a threaded inner surface of said outer sleeve and said inner locking mechanism comprises a threaded outer surface of said inner package, wherein said inner and outer locking mechanisms are engaged when said inner package is screwed into said outer sleeve.

17. The kit of claim 14 wherein said outer sleeve comprises a base plate, said inner package for being removably attached to said base plate.

18. The kit of claim 14 wherein said outer sleeve is formed from plastic.

* * * * *